United States Patent Office 2,948,493
Patented Aug. 9, 1960

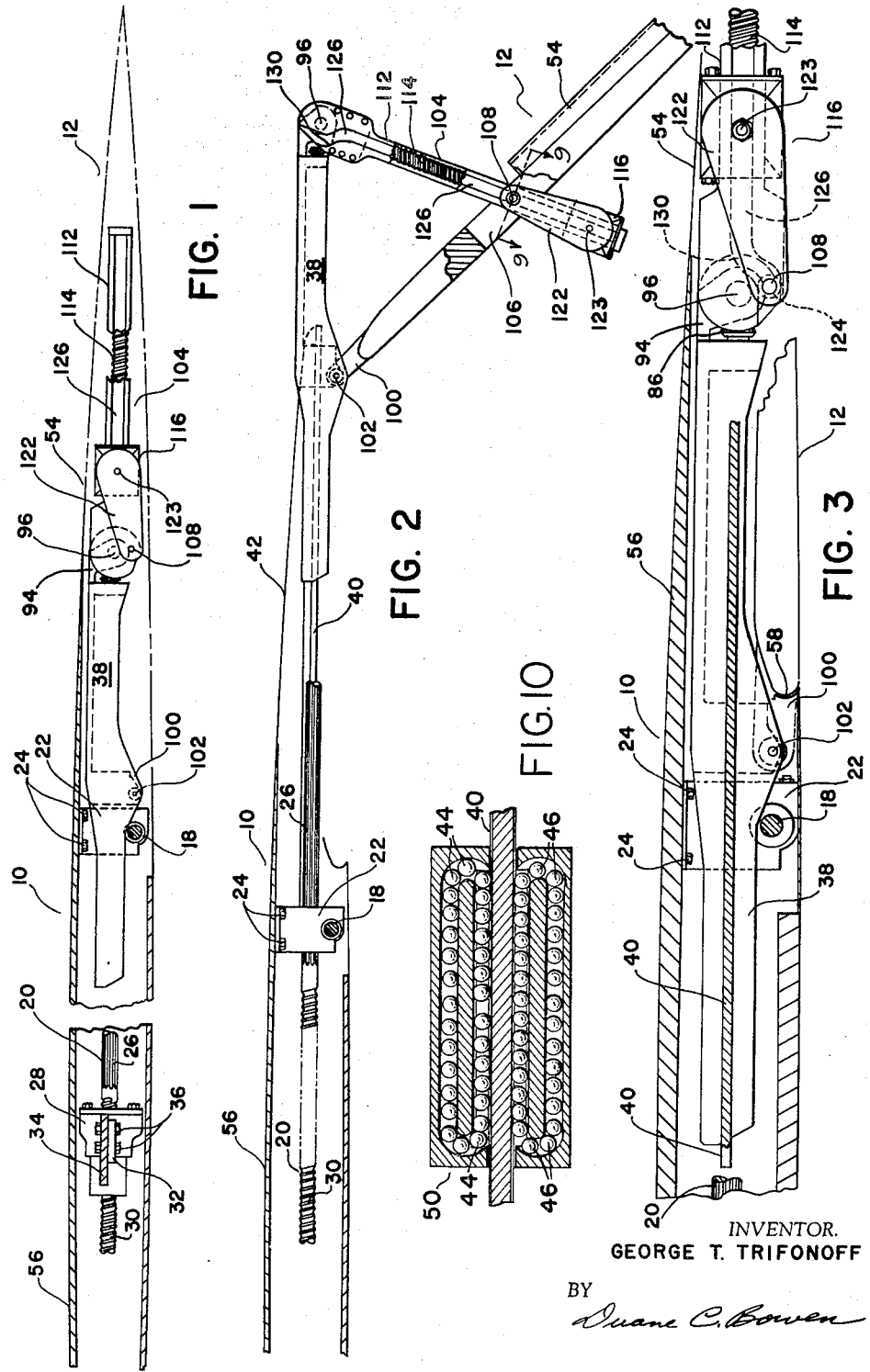

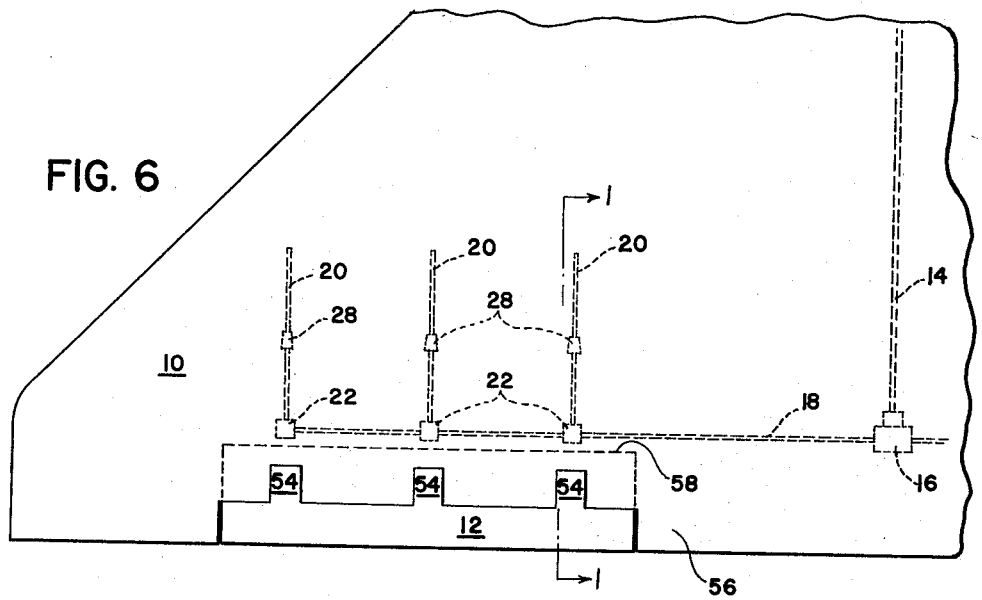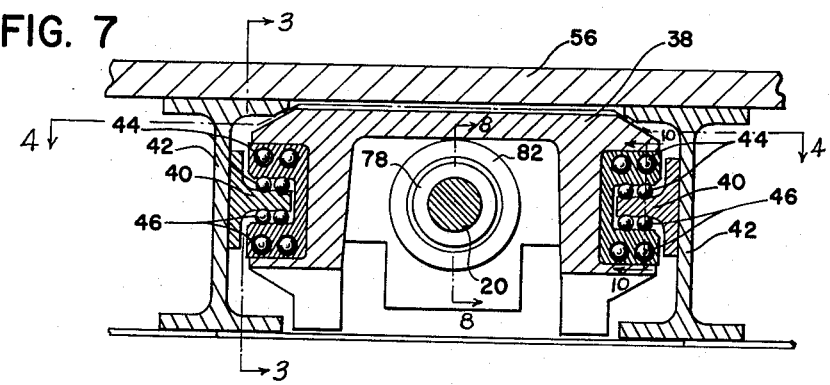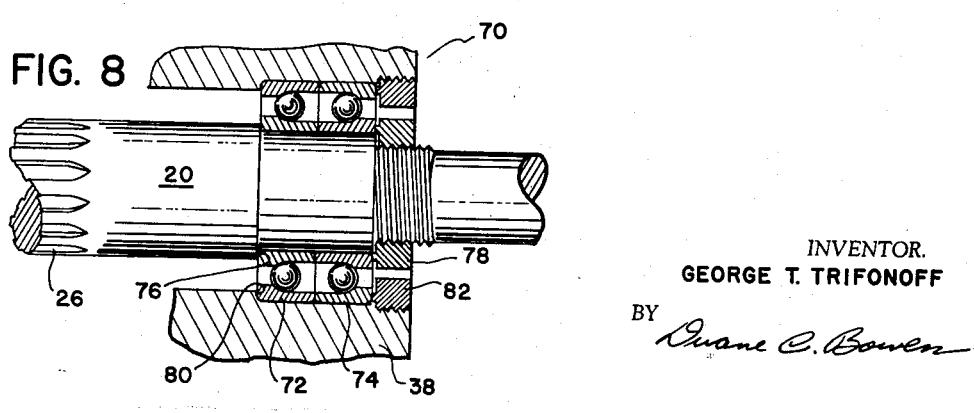

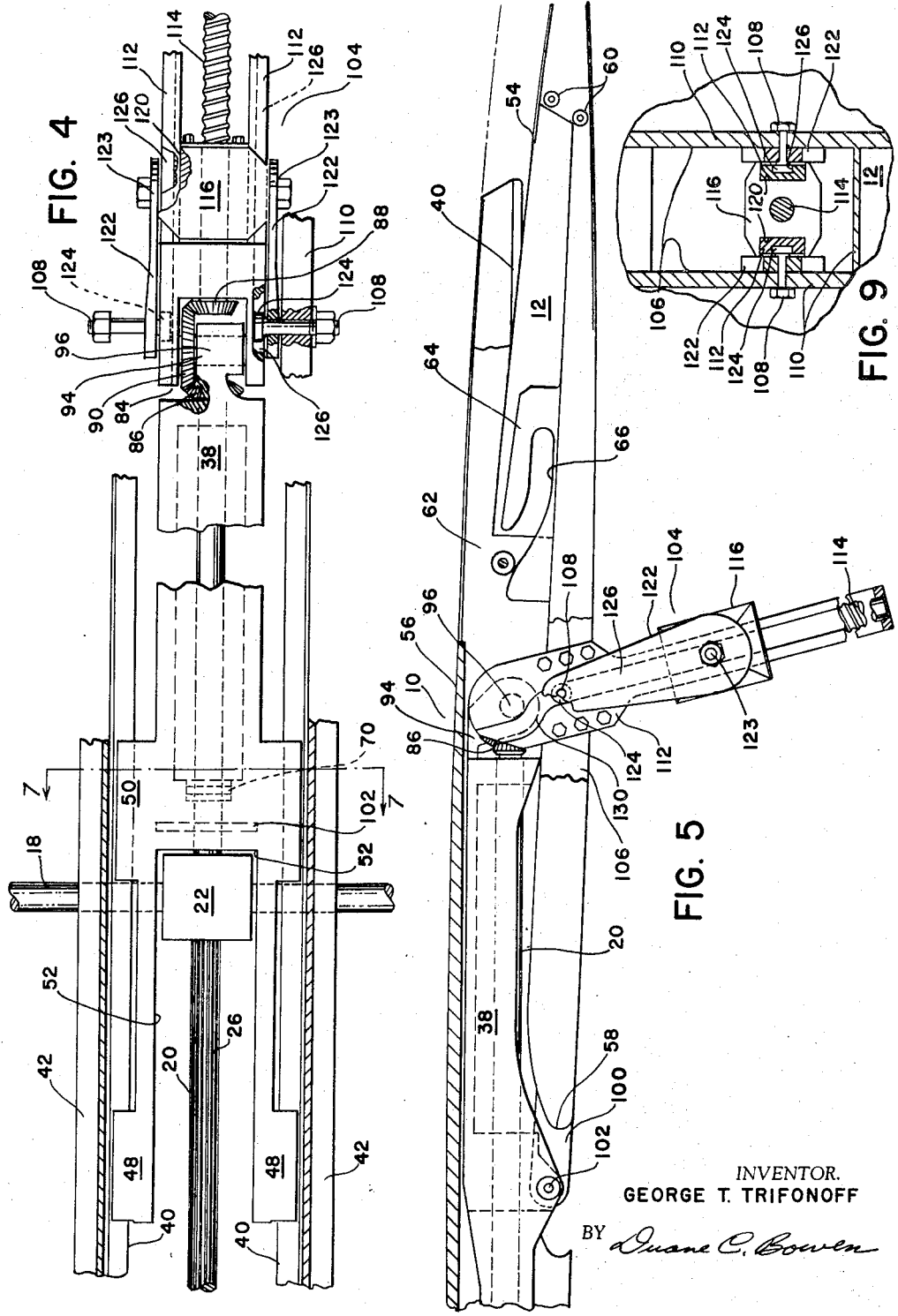

2,948,493
AIRCRAFT FLAP MECHANISM
George T. Trifonoff, Wichita, Kans., assignor to Boeing Airplane Company, Wichita, Kans., a corporation of Delaware Filed Jan. 2, 1958, Ser. No. 706,767
9 Claims. (Cl. 244—42)

My invention relates to a flap actuating mechanism. The structure is adapted for thin wings and provides for Fowler movement of the flap from a first position in which the flap and all of the actuating mechanism is housed within a thin wing envelope to a second position in which the flap is moved downwardly and rearwardly at an angle to the wing chord.

In some high speed aircraft it is desirable to provide a flap in a thin wing of about 5% thickness ratio or less, i.e., as low as 4 inches in thickness on some aircraft. The flap and actuating mechanism should be housed within the normal thin wing envelope in retracted position to avoid the severe drag that would result from any protrusions from the normal wing contour. This is a difficult problem because many common types of actuating mechanisms could not be housed in a thin wing and yet the support and actuating means must accept extreme loads.

The objects of my invention include: to provide a flap actuating mechanism of improved design, to devise support and actuating means which may be housed together with the flaps within the normal envelope of a thin wing, to provide the above in a structure which will withstand extreme loading, and to provide the above in a durable and efficient structure having the same operating characteristics as Fowler flap mechanisms provided for wings of normal thickness.

My invention will be best understood, together with additional advantages and objectives thereof, from a reading of the following description, read with reference to the drawings, in which:

Figure 1 is a view, partly in section, showing a specific embodiment of my flap and actuating mechanism with the flap in up position, the view being taken generally on line 1—1 of Figure 6;

Figure 2 is a view similar to that of Figure 1, being partly in section and being taken substantially on the same plane, but showing the flap in down position;

Figure 3 is an enlarged view, partly in section, showing the carriage structure, the view being taken generally on line 3—3 of Figure 7;

Figure 4 is a plan view, partly in section, of portions of the actuating and support members, the view being taken generally on line 4—4 of Figure 7;

Figure 5 is a view, partly in section, of portions of the carriage, actuating means and flap locking means, the view being taken substantially on the same plane as Figure 1 but showing the mechanism in a position just before the full up position;

Figure 6 is a plan view of a portion of a wing including the flap and showing the power input to the actuating means;

Figure 7 is a view partly in section taken on line 7—7 of Figure 4 showing the carriage support means;

Figure 8 is a view partly in section taken on line 8—8 of Figure 2 and showing a thrust bearing assembly in the carriage; and Figure 9 is a view principally in section taken on lines 9—9 of Figure 2 of the depending operating arm; and Figure 10 is a side view, principally in section, taken on line 10—10 of Figure 7.

The drawings show a representative example of a thin wing 10 in which the maximum thickness of the areas viewed may be six inches or less depending on the size of aircraft, e.g., a 5% or less thickness ratio. It is desired to move a flap 12 from the upper position shown in Figure 1 to the lower position shown in Figure 2. The mechanism may be divided into three portions: (1) power drive means, (2) traveling carriage assembly, and (3) flap and actuator mechanism.

*Power drive means*

Power to actuate the flap may be provided from a source not shown and transmitted through a shaft 14 in each wing 10 through a gear box 16 to a common drive shaft 18, as shown in Figures 4 and 6. Power is transmitted from common drive shaft 18 to a plurality of driven shafts 20 through gear boxes 22. Gear boxes 22 are fixed to wing structure as by screws 24 and act on ball splines 26 of driven shafts 20 to rotate the same. Driven shaft 20 is slidable fore and aft through gear box 22. Driven shaft 20 is moved fore and aft by means of a ball nut 28. Ball nut 28 has balls engaged in threads 30 of driven shaft 20 and thereby moves driven shaft 20 in opposite directions when the shaft 20 is rotated by the gears in box 22. Ball nut 28 is held against movement by a flange 32 secured to a supporting member 34 in the wing by screws 36.

*Traveling carriage assembly*

Each driven shaft 20 is secured to a traveling carriage 38 moving therewith. Carriage 38 is supported by a pair of opposed tracks 40 supported by structural members 42. As shown in Figures 4 and 7, upper and lower endless recirculating races of balls 44, 46 are provided on opposite sides of the carriage at each end 48 and 50. Carriage 38 is bifurcated at 52 so that ball race housings 48 can pass forward of gear box 22. As shown in Figure 6, flap 12 has upper portions 54 extending farther forward into the upper skin 56 than other upper portions. The leading edge of the flap in the lower skin is shown by the dotted lines 58 in Figure 6. Tracks 40 extend on structural members 42 to the rear edges of portions 54 to provide carriage flap support as far rearwardly as possible. Track 40 serves a second purpose in the closing movement of the flap as shown in Figure 5 wherein a pair of rollers 60 engage the rear end of track 40 to lock the flap in upper position. Locking is also accomplished by a forward roller 62 supported by the wing structure. A hook member 64 on the flap has a camming slot 66 which engages roller 62 and biases flap 12 into upper position. This guides the engagement of roller 60 on track 40. The function of these parts is to accept loads during closing and opening movements and when the flap is fully closed. The actuating means is independent of these parts and they are not necessary in the absence of high loadings.

Shaft 20 is rotatably supported and thrust is accepted by bearing means 70, the location of which is shown in Figure 4. As shown more fully in Figure 8, combined thrust and radial bearing 70 includes paired roller bearings 72, 74 held between a shoulder 76 and a threaded nut 78 on shaft 20 and between the inner wall of a counter bore 80 in carriage 38 and a ring nut 82 threaded in the end of the counter bore.

A bevel gear assembly 84 is provided at the rear end of shaft 20 and includes a bevel gear 86 on the end of shaft 20, an opposite gear 88 and a side gear 90. Carriage 38 has an end boss 94 forming a bearing for a transverse shaft 96 on which side gear 90 is mounted.

Flap and actuator mechanism

The forward portion 100 of the flap 12 makes pivotal connection by a bolt 102 to carriage 38. A pivotal arm assembly 104 extends through a slot 106 in flap 12 and makes pivotal connection therewith by bolts 108 secured to structural members 110 in the flap.

Pivotal arm assembly 104 includes a pair of side plates 112 secured together at their upper end by shaft 96 at the bevel gear assembly 84. A threaded rod or shaft 114 is rotatably supported therebetween and attached to bevel gear 88. A traveling ball nut 116 is engaged with the threads of shaft 114 and travels between upper and lower positions responsive to rotation of gear 88 which in turn rotates with shaft 20. The housing of nut 116 has slots 120 in which plates 112 are positioned permitting sliding of the nut up and down plates 112 while holding the nut against rotation. The pivotal arm is guided by a pair of pivotal links 122 pivotably secured to nut 116 at their lower ends by stub shafts and nuts 123 and having cam follower rollers 124 acting in slot cam tracks 126 in side plates 112. The upper end of links 122 are also the points of joinder to flaps 12 by bolts 108.

Track 126 is straight except at the upper end and this bent portion 130 serves the purpose during closing movement of biasing the pivotal arm assembly to the position within the contour of the wing as shown in Figure 1 in closed position. The bend is an arc about the center line of bevel gear shaft 96. This action is permitted by the pivotal connection 123 of links 122 to ball nut housing 116. The opening and closing action will be explained in more detail in the description of operation.

Operation

Assuming that the flap 12 is in the position shown in Figure 1, rotation of shafts 20 is accomplished by power applied through shaft 14, gear box 16, common shaft 18 and gear box 22. This initial rotation moves carriage 38 rearwardly and through the bevel gear assembly 84 rotates pivotal rod 114. Initial rearward movement of carriage 38 and flap 12 results in disengagement of roller 60 with track 40 and slot 66 with roller 62. During this rearward movement, the bend 130 in slot track 126 causes pivotal arm 104 to pivot downwardly as nut 116 and links 122 tend to move away from the bevel gear box axis. Carriage 38 meanwhile is traveling rearwardly supported by endless ball races 44, 46 acting on tracks 40. As nut 116 moves down, flap 12 pivots about pivot 102 until a position such as shown in Figure 2 is reached where the flap is fully extended.

In the reverse direction, rotation of the shafts 14, 18, 20, 114 are in an opposite direction and carriage 38 tends to move forward because of the action of the threaded portion 30 acting in the fixed ball nut 28. Nut 116 is moving upwardly on threaded rod 114 until a position such as is shown in Figure 5 is reached. At this point further upward movement engages roller 62 with slot 66 of hook 64 and the flap is guided to the point that rollers 60 engage on either side of track 40. The rollers 124 acting in the slot track 126 will strike the bend 130 immediately before the flap is fully retracted and this will act to pivot the pivotal arm assembly 104 completely up into the normal thin wing contour.

To further explain the initial opening and final closing movements of the parts, when power is applied in the Figure 3 position nut 116 starts to move away from bevel gear axis 96. Nut 116 pulls on links 122 but they can not move rearwardly because of the attachment to flap 12 by pins 108 and the attachment of flap 12 to carriage 38 at 102. Therefore, nut 116 must move downwardly to extend. As nut 116 and threaded rod 114 pivot downwardly, bent track segment 130 pivots about axis 96 and, this being substantially a true arc about axis 96, rollers 124 are brought to a position to travel down the straight part of slot track 126.

In the closing movement, starting in the Figure 5 position, rollers 124 must travel an arcuate path about pivot 102 to which flap 12 is attached. As nut 116 moves upwardly, rollers 124 apply pressure against the walls of track 126 at bend 130 and bias depending arm 104 to the Figure 3 position.

From the foregoing description, the sequence of operation of the flap and actuating mechanism between upper and lower position will be understood. The flap and all of the operating parts are contained within the thin wing envelope. An unobvious feature is that the operating mechanism through careful design of the parts will accept the extreme loadings to which the flap would be subjected in high performance aircraft. While other mechanisms might be adapted to secure the same travel of the flap and be contained within a thin wing envelope, few would be adapted to accept these loadings.

Having thus specifically described my invention, I do not wish to be understood as limiting myself to the precise details of construction shown, but instead wish to cover those modifications thereof which will occur to those skilled in the art from my disclosure and which fairly fall within the scope of my invention, as described in the following claims.

I claim:

1. In a vehicle having a thin wing and a flap on said wing, means for moving said flap rearwardly and downwardly from a position within the profile of said wing, comprising: a carriage and track means in said wing supporting said carriage for movement between a first forward position and a second rearward position, a rotatable shaft extending forwardly from said carriage and means operative to rotate said shaft and means operative upon rotation of said shaft to move said carriage between said first and second positions, means pivotally connecting the forward portion of said flap to said carriage, a rotatable rod between said carriage and said flap connected to said carriage at a point rearward of the point of pivotal connection of the flap, said rotatable rod being connected to said rotatable shaft to be rotated thereby and a nonrotatable nut on said rotatable rod connected to said flap whereby the flap is lowered and raised responsive to rotation of said shaft.

2. The subject matter of claim 1 in which there is a plate juxtaposed to said rotatable rod having a cam track on a surface thereof, said nut being connected to said flap by a link pivotally connected to the flap and to the nut, said link having a cam follower engaged with said cam track, said track being formed to hold said rod in a position extending transversely of said flap in lower and medial positions of said flap and to move said rod to a position in the plane of said flap and within said profile in the uppermost position of said flap.

3. In a vehicle having a wing and a flap on said wing, means for moving said flap rearwardly and downwardly from a position within the profile of said wing, comprising: a carriage and support means in said wing supporting said carriage for movement between a first forward position and a second rearward position, means operative to move said carriage between said positions, means pivotally connecting the forward portion of said flap to said carriage, an arm connected to said flap and said one arm being connected to said carriage at a point rearward of the point of pivotal connection between the flap and the carriage, and drive means operative to expand and contract said arm whereby said flap is moved forwardly and rearwardly with said carriage and said flap is pivoted up and down by expansion and contraction of said arm.

4. The subject matter of claim 3 in which said arm between said carriage and flap includes a threaded rod attached to one and a nut attached to the other and said drive means operating to achieve relative rotation between said rod and said nut to move said flap up and down.

5. The subject matter of claim 4 in which said means operative to move said carriage includes a rotatable shaft connected thereto and means to rotate said rotatable shaft and in which said drive means includes said rotatable shaft which is used to transmit power to achieve said relative rotation between said rod and nut.

6. The subject matter of claim 5 in which said means operative to move said carriage includes a threaded portion on said rotatable shaft and a fixed nut in said wing acting on said threaded portion, gear means and a splined portion of said shaft engaged with said gear means and power means for said gear means whereby said carriage is moved responsive to said power means.

7. The subject matter of claim 3 in which said arm between said carriage and flap includes a threaded, rotatable rod connected to said carriage and a non-rotatable nut connected to said flap, said drive means operating to rotate said rod to move said flap up and down, said rod extending transversely through the plane of said flap in lower and medial positions, and means operative to pivot said rod into a position aligned with the plane of said flap in upper position.

8. The subject matter of claim 7 in which said means to pivot said rod includes a pivotal link connecting said nut to said flap, a member on said arm providing a cam track and a cam follower connected to said link and said cam track acting through said pivotal link to bias said rod from the position extending transversely through the plane of said flap in lower and medial positions to the position aligned with the plane of said flap in the upper positions of said flap.

9. The subject matter of claim 3 in which said arm extends transversely of the plane of said flap in lower and medial positions and in which said arm assumes a position aligned with the plane of said flap in upper position.

References Cited in the file of this patent
UNITED STATES PATENTS

| | | |
|---|---|---|
| 2,404,956 | Gouge | July 30, 1946 |
| 2,423,984 | Knoll | July 15, 1947 |
| 2,620,147 | Butler et al. | Dec. 2, 1952 |